Feb. 5, 1929.
R. KLIEM ET AL
1,700,767
RELEASABLE DRAFT COUPLING FOR TRACTORS
Filed June 11, 1927
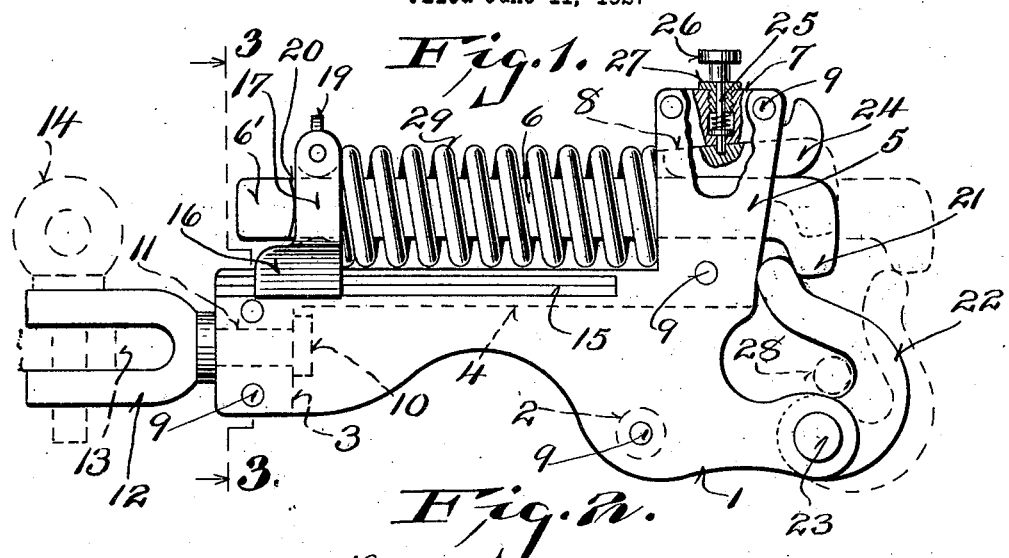
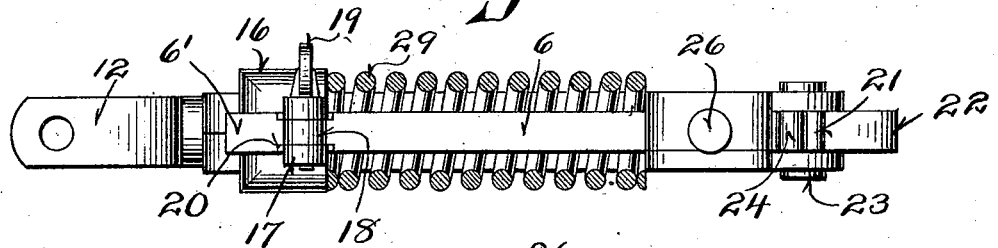
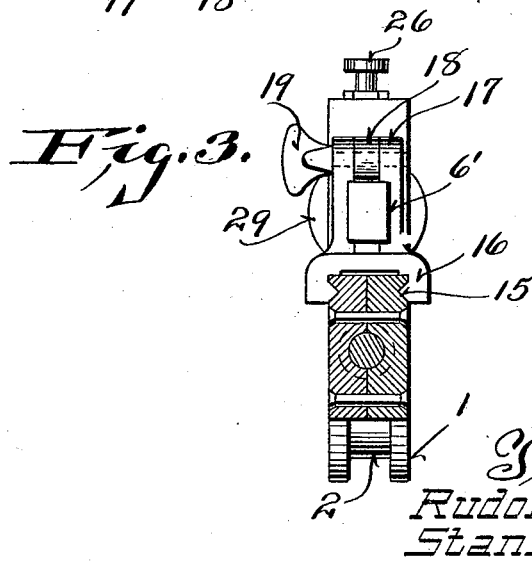
Inventors
Rudolf Kliem
Stanley F. Urbaniak Patented Feb. 5, 1929.

1,700,767

UNITED STATES PATENT OFFICE.

RUDOLF KLIEM AND STANLEY F. URBANIAK, OF MILWAUKEE, WISCONSIN.

RELEASABLE DRAFT COUPLING FOR TRACTORS.

Application filed June 11, 1927. Serial No. 198,214.

This invention relates to a releasable draft attachment for tractors, such for instance, as devices commonly known as tractor hitches.

In tractor hitches as heretofore constructed, attempts have been made to provide a releasable or automatic hitch which will release when the load or drag upon the tractor exceeds a predetermined amount. These devices, however, have not proven wholly satisfactory as they are relatively complicated and likely to get out of order on the one hand, and on the other hand, necessitate either a compressing of the spring, which necessarily is heavy, or else a readjustment of a large number of parts in order to reattach the device to the tractor.

This invention is designed to overcome the defects noted above and objects of such invention are to provide a novel form of tractor hitch which automatically releases when the load exceeds a predetermined amount and which may be restored to latching condition without readjusting a large number of parts and without the necessity of compressing the spring or making other difficult adjustments, but which instead may be again latched in a very simple and easy manner.

Further objects are to provide a tractor hitch having the characteristics noted above, which nevertheless is of very simple construction and has a small number of rugged and strong parts.

An embodiment of the invention is shown in the accompanying drawings in which:

Figure 1 is a side elevation of the device with parts broken away showing the device in full lines in locked position and in dotted lines in other positions of adjustment, as will appear hereinafter;

Figure 2 is a plan view with the spring shown in section to more fully illustrate the locking bar;

Figure 3 is a sectional view on the line 3—3 of Figure 1.

Referring to the drawings, it will be seen that the tractor hitch comprises a body portion 1 which may be formed of a pair of spaced flanges, one of which is provided with a spacing boss 2. The flanges are provided with thickened rear portions 3 which abut when the device is assembled. The upper portion of the webs 1, or flanges, are provided with thickened portions 4 which abut when the device is assembled. The body portion extends upwardly adjacent its front to provide spaced guiding arms 5 between which the locking bar 6 is slidably mounted. A spacer 7 is positioned between the arms 5 and is provided with a rearwardly and downwardly slanting bottom surface 8. The webs or flanges 1 forming the body portion are securely held together by means of rivets 9 which are passed through the boss 2, the rectangular rear portion 3, the thickened portion 4, and the spacer 7, to thus securely lock all of the parts rigidly together. The purpose of this two-part construction is to provide a ready means for retaining the enlarged head 10 and the shank 11 of the connecting clevis 12 for the cultivator or other machine or load which is dragged along by the tractor. The clevis, obviously, may be connected in any desired manner to the tongue 13 of the drawn instrumentality, as for example, by means of a removable pin 14.

The upper portion of the body of the device is provided with V-shaped guides or grooved portions 15 within which a slide 16 is adapted to fit. This slide extends upwardly and is provided with a pair of spaced upper arms 17 which are normally bridged by means of a spacing sleeve 18 and which are joined by a thumb screw 19. These spaced arms 17 receive between them the locking bar 6, and it is to be noted that this locking bar is provided with a reduced portion 20 (see Figure 2) which permits its upward passage between the spacing arms 17 when the screw 19 and the sleeve 18 are removed. The reduced portion continues a slight distance beyond the arms and is integrally joined to an enlarged rear portion 6' whose slightly curved forward face bears against the vertical face of the arms 17 and thus interlocks the bar and the arms. The forward end of the bar 6 is downturned to provide a locking lip 21 which cooperates with the end of a pivotally mounted latch 22. This latch 22 is pivoted upon a pintle pin 23 passing through the forward end of the webs or flanges 1, as shown in Figure 1.

In order to hold the locking bar in locking engagement with the latch 23, a wedge-shaped member 24 is slid between the locking bar 6 and the slanting surface 8 of the spacing member 7. It is retained in place by means of a spring pressed locking plunger 25 provided with a manipulating head 26. Thus, when the parts are in the position shown, the plunger 25 locks the wedge 24 in place and prevents its longitudinal shifting. The wedge, in turn, holds the slidably mounted locking bar 6 with its lip 21 in engagement with the latch 22. A convenient way of mounting the plunger 25 is to carry the plunger within a screw threaded sleeve or gland 27 which screws into the spacing block 7. A spring, as shown in the drawings, cooperates with the plunger 25 and urges it into locking position. The locking bar 6 is surrounded by a relatively heavy spring 29 which bears at its rear end against the arms 17 of the slide and at its forward end bears against the arms 5 of the body portion.

In using the device, the clevis or draft portion 28 of the tractor is hooked into the curved latch 22, as shown, and the device drawn by the tractor is received by the member 12. When a predetermined load is exceeded, the latch 22 is rocked into its dotted line position, thereby drawing the locking bar 6 outwardly into the extended or dotted line position. Under these conditions, the latch clears the lip 21 of the locking bar and releases the tractor from the load.

In reestablishing connection between the locking bar and the latch it is not necessary to compress the spring 29. All that is necessary is to release the wedge 24 from the plunger 25 by drawing upwardly upon the head 26. The wedge is slipped forwardly, thus permitting lateral rocking of the locking bar 6 into its upper dotted line position shown in Figure 1. When in this position, the latch 22 may be again passed through the clevis 28 of the tractor and rocked rearwardly into its full line position. Thereafter, the locking bar is pressed downwardly into engagement with the end of the latch and the wedge 24 is again inserted in place to prevent lateral rocking of the bar 6.

It will be seen, therefore, that a very simple means has been provided to permit reestablishment of the locking connection between the locking bar 6 and the latch 22 without compressing the heavy spring 29.

Further, this reestablishment of the locking connections may be secured without unscrewing any bolts or nuts or otherwise executing a large number of operations. Instead, it is very simply performed.

It will be seen further that a very simple type of tractor hitch having the automatic characteristic of releasing the load when it exceeds a predetermined value has been provided by this invention.

It will be seen further that the device may be very easily and cheaply manufactured and readily assembled.

Although the invention has been described in considerable detail, such description is intended as illustrative rather than limiting as the invention may be variously embodied and as the scope of such invention is to be determined as claimed.

We claim:

1. A tractor hitch comprising a body portion having means at its rear for attachment to a load, a pivotally mounted latch for removably receiving the draft portion of a tractor, a slidably mounted spring held locking bar for yieldingly holding said latch against opening movement, and movable means for permitting lateral shifting of the locking bar for reestablishing locking engagement between said latch and locking bar, and releasable means for holding said locking means against movement.

2. A tractor hitch comprising a body portion, a clevis receiving lever pivoted thereto and having a free end, a longitudinally slidable bar carried by said body portion and having a lip engaging the free end of the lever, a guide carried by the body portion through which said bar is adapted to slide, and a wedge normally restraining said bar from lateral motion, said wedge being carried by said guide and being removable therefrom to permit the lateral rocking of said bar.

In testimony that we claim the foregoing we have hereunto set our hands at Milwaukee, in the county of Milwaukee and State of Wisconsin.

RUDOLF KLIEM.
STANLEY F. URBANIAK.